United States Patent
Riedel, Jr. et al.

(10) Patent No.: US 11,274,765 B2
(45) Date of Patent: Mar. 15, 2022

(54) VALVE CAP ADAPTER AND ARRANGEMENT AND METHOD OF REMOVING A VALVE CAP

(71) Applicant: Caterpillar Inc., Peoria, IL (US)

(72) Inventors: Robert E. Riedel, Jr., Fox River Grove, IL (US); Nickolas J. Gretz, Lake in the Hills, IL (US); James D. McPhail, Round Lake Heights, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/895,386

(22) Filed: Jun. 8, 2020

(65) Prior Publication Data
US 2021/0381615 A1 Dec. 9, 2021

(51) Int. Cl.
*F16K 27/12* (2006.01)
*B25B 13/50* (2006.01)
*B25B 23/00* (2006.01)

(52) U.S. Cl.
CPC .............. *F16K 27/12* (2013.01); *B25B 13/50* (2013.01); *B25B 23/0078* (2013.01)

(58) Field of Classification Search
CPC ......... B25B 13/50; B25B 17/00; B25B 17/02; B25B 23/0078; F04B 53/22; F16K 27/12; F16K 35/00; F16K 35/06
USPC ............. 137/15.18, 15.22, 15.24; 251/89, 90
See application file for complete search history.

(56) References Cited

U.S. PATENT DOCUMENTS

| | | | | |
|---|---|---|---|---|
| 3,840,041 A | * | 10/1974 | McMurray | F16K 35/06 137/296 |
| 3,979,965 A | * | 9/1976 | Vuceta | B25B 17/02 74/410 |
| 4,885,962 A | | 12/1989 | Summers | |
| 5,727,590 A | * | 3/1998 | Julicher | E03B 9/06 137/296 |
| 7,062,992 B2 | | 6/2006 | Spirer | |
| 7,225,707 B2 | * | 6/2007 | Knopp | B25B 21/00 81/57 |
| 8,225,698 B2 | | 7/2012 | Yang | |
| 8,763,496 B2 | | 7/2014 | Case et al. | |
| 10,265,837 B2 | * | 4/2019 | Lin | B25B 17/02 |
| 10,427,276 B2 | | 10/2019 | Barzelay | |
| 2011/0283537 A1 | * | 11/2011 | Case | B25B 23/0078 29/890.124 |
| 2019/0195388 A1 | * | 6/2019 | Childress | F16K 35/06 |
| 2019/0242492 A1 | * | 8/2019 | Harbour | F16K 31/60 |

FOREIGN PATENT DOCUMENTS

KR 10-2011-0038535 A 4/2011

* cited by examiner

*Primary Examiner* — Kevin F Murphy
*Assistant Examiner* — Jonathan J Waddy
(74) *Attorney, Agent, or Firm* — Leydig, Voit & Mayer, Ltd

(57) ABSTRACT

Method of removing a valve cap threadedly engaged with a valve body includes inserting at least one coupling rod from a cap adapter through a valve cap attachment hole to couple the structures, coupling an output drive of a torque multiplier with the adapter, and exerting an input torque on the torque multiplier to rotate the adapter and valve cap, the input torque exerted on the torque multiplier being increased by the torque multiplier.

19 Claims, 9 Drawing Sheets

VALVE CAP ADAPTER AND ARRANGEMENT AND METHOD OF REMOVING A VALVE CAP

TECHNICAL FIELD

This patent disclosure relates generally to the inspection and servicing of valves, and, more particularly to an arrangement and method for removing a valve cap.

BACKGROUND

Valves utilized in various applications include components that may be degraded during use. For example, components of suction and discharge valves utilized in reciprocating pumps may be prone to degradation as a result of fluids conveyed through such pumps. Consequently, such valves may include serviceable elements that may be either repaired or replaced upon inspection after removing a valve cap. The inspection and service of conventional valves may be complicated, however, by a seized cap, which may be exceedingly difficult to remove. Current disassembly tools and methods have been determined to be deficient in opening seized valves.

A method and apparatus for removing a valve cap are disclosed in U.S. Pat. No. 8,763,496 to Case et al. Case discloses a hydraulic tool that is coupled to the valve cap either directly or by way of a multifaceted valve cap extender that may be leveraged against an adjacent valve cap or a reaction tube extender coupled with an adjacent valve cap.

SUMMARY

The disclosure describes, in one aspect, a method of removing a valve cap threadedly engaged with a valve body, wherein the valve cap includes at least one attachment hole. The method includes providing a cap adapter including a cap adapter coupling structure and at least one coupling rod, inserting at least one coupling rod through the at least one attachment hole to couple the cap adapter to the valve cap, coupling an output drive of a torque multiplier with the cap adapter coupling structure to prevent relative rotation between the torque multiplier and the cap adapter coupling structure, and exerting an input torque on the torque multiplier to rotate the cap adapter and the valve cap, the input torque exerted on the torque multiplier being increased by the torque multiplier such that an output torque exerted on the cap adapter is greater than the input torque.

The disclosure describes, in another aspect, an arrangement for removing a valve cap engaged with a valve body, wherein the valve cap includes at least one attachment hole. The arrangement includes a cap adapter and a torque multiplier. The cap adapter includes a cap adapter coupling structure, and at least one coupling rod. The at least one elongated coupling rod is configured to be received into at least one attachment hole. The torque multiplier includes a head containing a plurality of gears and an output drive, and an input engagement structure. The output drive of the torque multiplier is configured to be coupled with the cap adapter coupling structure to prevent relative rotation between the output drive of the torque multiplier and the cap adapter coupling structure. The plurality of gears is configured to receive an input torque from the input engagement structure, and provide an output torque to the output drive, the output torque being greater than the input torque.

The disclosure describes, in yet another aspect, a valve cap adapter configured to be coupled to a valve cap including a tubular wall having at least one pair of attachment holes extending through the tubular wall. The valve cap adapter includes a body and a cap adapter coupling structure. The body includes an upper surface, a lower surface, a generally cylindrical sidewall extending between the upper surface and lower surface, and at least two coupling holes; the coupling holes are axially aligned with one another. The cap adapter coupling structure extends axially from and is secured with the upper surface of the body; the cap adapter coupling structure includes a hex head.

BRIEF DESCRIPTION OF THE DRAWING(S)

DETAILED DESCRIPTION

Figure 1:
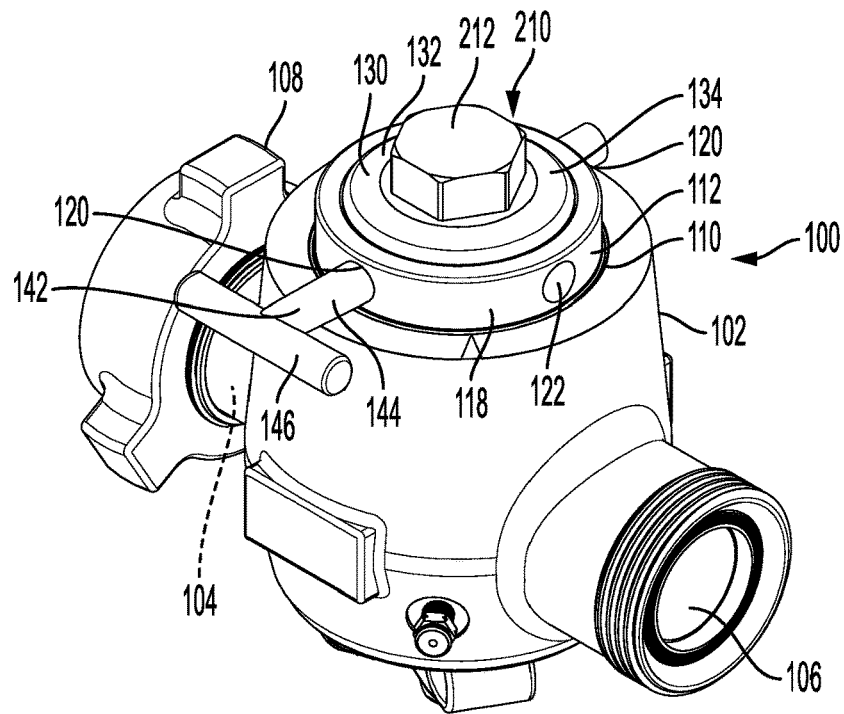
FIG. 1 is an isometric view of a valve and an embodiment of a valve cap adapter and coupling assembly according to aspects of this disclosure.

This disclosure relates to valves, and more specifically to an arrangement for removing a valve cap from a valve body as illustrated, for example, in FIG. 1. It will be appreciated that the disclosed arrangement for removing a valve cap may be utilized with various types of valves, the illustrated valve 100 serving only as an example in that the arrangement may be utilized with alternative valve types and designs.

The exemplary valve 100 includes a valve body 102 having a plurality of fluid flow bores 104, 106. The illustrated embodiment further includes a coupler 108 engaged with the valve body 102. The coupler 108 may be utilized to couple to the fluid flow bore 104 to a conduit or the like (not illustrated) to provide a fluid flow passageway to or from the valve body 102. The valve 100 further includes an access opening 110 with which a valve cap 112 is engaged. While any appropriate engagement may be provided, in the illustrated valve 100, the valve cap 112 and valve body 102 include respective engaging threads 114, 116 (see FIG. 5). It will be appreciated, however, that an alternative engaging arrangement may be provided, for example, by way of engaging flanges and slots. For the purposes of this disclosure, the term "threaded engagement" shall mean any such coupling engagement, including threads, flanges and slots, and other securely engaging structures engagable or disengagable by axial rotation of the valve cap 112 relative to the valve body 102.

The valve cap 112 further a tubular wall 118 that protrudes from the valve body 102 when the valve cap 112 is engaged with the valve body 102. The tubular wall 118 includes at least one attachment hole 120. The illustrated embodiment includes at least one pair of attachment holes 120 that are in axial alignment with one another, only one of the attachment holes 120 being visible in FIG. 1. The tubular wall 118 may include additional attachment holes 122 or pairs of attachment holes 122. In the valve cap 112 illustrated in FIG. 1, for example, two pairs of attachment holes 120, 122 are provided, although the valve cap 112 may include three or more pairs of attachment holes or single such holes that are not in axial alignment with another such hole through the tubular wall 118. For the purposes of this disclosure, the term "attachment hole(s)" will refer to any hole extending radially through the tubular wall 118 of the valve cap 112, whether or not any given hole is in axial alignment with another hole extending through the tubular wall 118. Moreover, while the illustrated attachment holes 120, 122 are round, the attachment holes 120, 122 are not necessarily required to be circular.

In accordance with this disclosure, there is provided a cap adapter 130 configured to be coupled to the valve cap 112. Referring to the embodiment illustrated in FIGS. 1, 2, 5, and 6, the cap adapter 130 includes a body 132 configured to be disposed substantially adjacent the tubular wall 118 of the valve cap 112. In this embodiment, the body 132 is configured to be at least partially received within the tubular wall 118 of the valve cap 112. While the body 132 may be of an alternative shape, in the illustrated embodiment, the body 132 includes an upper surface 134, a lower surface 136, and a sidewall 138 extending between the upper and lower surfaces 134, 136. In the illustrated embodiment, an outer periphery of the lower surface 136 is slightly smaller than an outer periphery of the upper surface 134, the sidewall 138 having a generally tapered cylindrical structure. Those of skill in the art will appreciate that this tapered cylindrical structure may assist in placement of at least a portion of the body 132 within the tubular wall 118 of the valve cap 112. Moreover, in at least some embodiments, the sidewall 138 of the cap adapter 130 and the interior surface 119 of the tubular wall 118 may closely conform. In the illustrated embodiment, for example, the tapered cylindrical structure of the sidewall 138 of the cap adapter 130 closely conforms to the frustoconical interior surface 119 of tubular wall 118 (see cross-section of FIG. 5).

In order to couple the cap adapter 130 to the tubular wall 118 of the valve cap 112, the body 132 of the cap adapter 130 is provided with at least one coupling hole 140, which may be aligned with the attachment hole(s) 120 of the tubular wall 118 when the cap adapter 130 is disposed with the valve cap 112. In the illustrated embodiment, two coupling holes 140 are provided, which are axially aligned with one another within the body 132. While the radially extending holes 140 may be separate channels within the body 132, in at least some embodiments the coupling holes 140 may be radially-extending holes that unite within the body 132 to together form a radially-extending through hole extending through the body 132.

Figure 3:
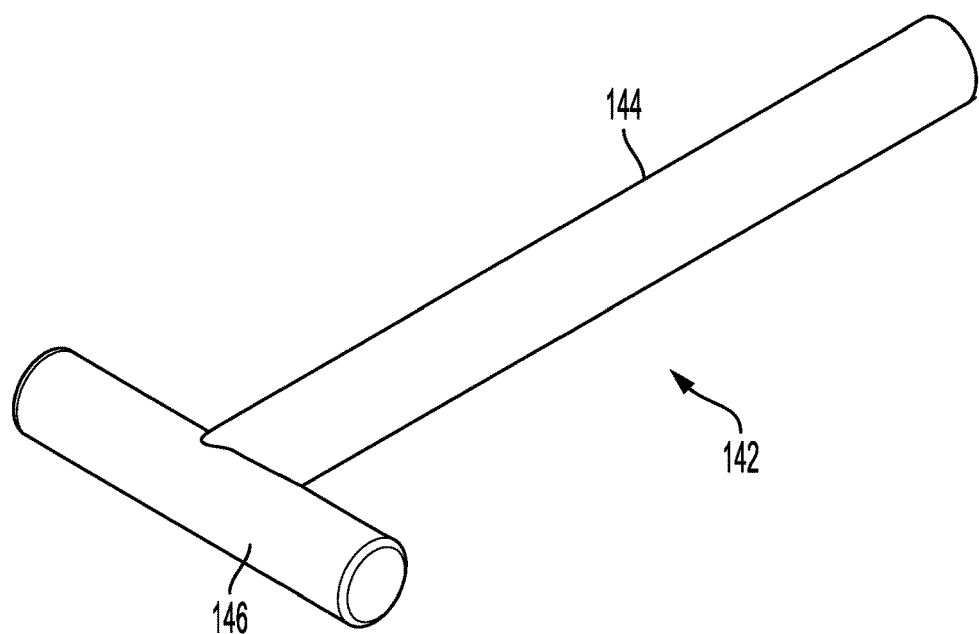
FIG. 3 is an isometric view of a coupling assembly of FIG. 1.

To couple the cap adapter 130 with the tubular wall 118 of the valve cap 112, at least one coupling assembly 142 is provided. An exemplary coupling assembly 142 is illustrated in FIG. 3. The illustrated coupling assembly 142 includes an elongated coupling rod 144 and a handle portion 146. While the illustrated handle portion 146 is disposed as a right angle to the elongated coupling rod 144, it will be appreciated that an alternative handle design or disposition may be provided. In at least one embodiment, for example, a portion of an elongated coupling rod itself may be utilized as the handle portion for manipulation of the elongated coupling rod into engagement with one or more of the attachment holes of the valve cap and one or more of the coupling holes of the cap adapter.

In use, the cap adapter 130 is positioned with the body 132 disposed with the tubular wall 118, here, at least partially within the tubular wall 118 of the valve cap 112, aligning the coupling hole(s) 140 of the cap adapter 130 with the attachment hole(s) 120 of the valve cap 112. In the illustrated embodiment, the elongated coupling rod 144 of the at least one coupling assembly 142 is then inserted into one of the attachment hole(s) 120 of the tubular wall 118 of the valve cap 112, and into one of the coupling holes 140 of the cap adapter 130. In an embodiment wherein there are at least two coupling holes 140 that form a through hole extending through the body 132, the elongated coupling rod 144 may then be extended through the other of the at least two coupling holes 140 and through another of the attachment holes 120 of the valve cap 112 to secure the cap adapter 130 with the valve cap 112. Should two coupling holes 140 not join to form a through hole, however, an additional elongated coupling rod 144 may be provided for insertion into the other of the attachment holes 120 of the tubular wall 118 and the second coupling hole 140 of the cap adapter 130, FIG. 1 being representative of both such arrangements.

Figure 4:
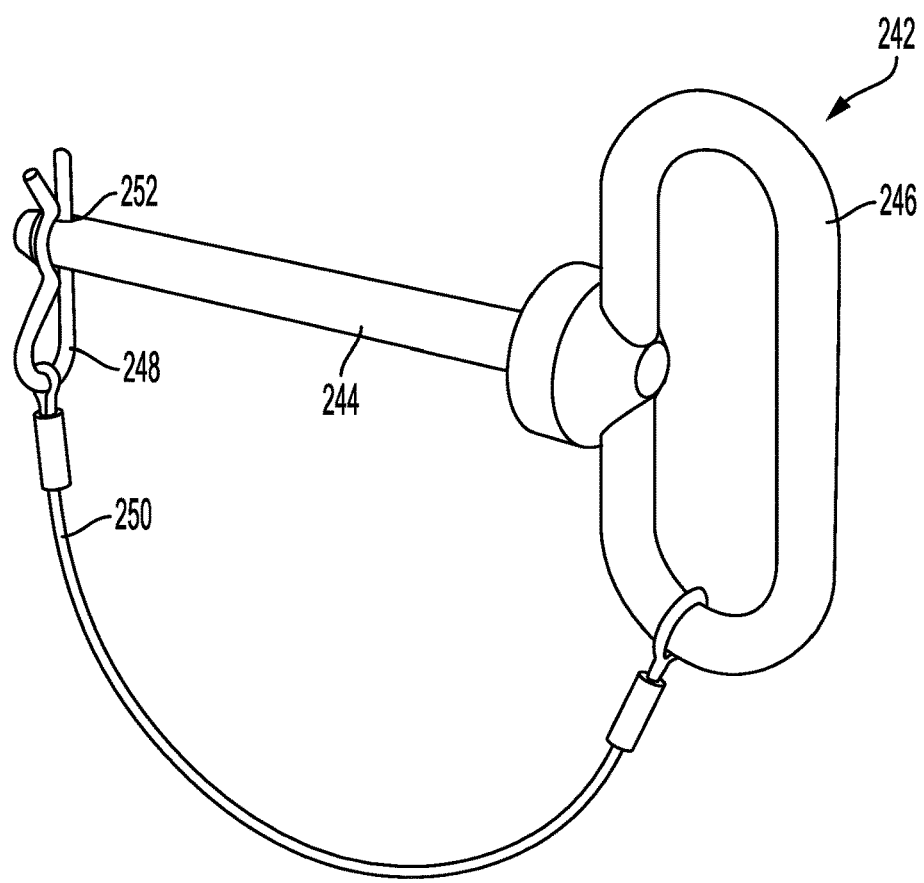
FIG. 4 is an isometric view of an alternative embodiment of a coupling assembly.

An alternative embodiment of a coupling assembly 242 that may be utilized with such a through hole extending through the body 132 is illustrated in FIG. 4. The coupling assembly 242 includes an elongated coupling rod 244 with a handle portion 246. The coupling assembly 242 further includes a clevis 248, which may be coupled to the handle portion 246 by a cable 250. In order to receive the clevis 248, a distal end of the elongated coupling rod 244, that is, opposite the handle portion 246, may include a bore 252. In this way, the elongated coupling rod 244 may be extended through the through hole, and the clevis 248 inserted into the bore 252 in the distal end of the elongated coupling rod 244.

Returning to FIG. 2, the cap adapter 130 may include additional structure, such as an extension 148 from the lower surface 136 in order to facilitate the use of the cap adapter 130 with a valve 150 that may include an alternatively configured or structured valve cap 152. For example, when the cap adapter 130 is utilized in the embodiment of the valve 150 of FIG. 6, an interior surface 153 of the tubular wall 154 of the valve cap 152 is of a greater diameter than the interior surface 119 of the tubular wall 118 of the valve cap 112 of FIG. 5. Thus, while the cap adapter 130 is disposed with the tubular wall 154 of the valve cap 152 in FIG. 6, the cap adapter 130 is disposed substantially adjacent, but slightly spaced from the tubular wall 154 of the valve cap 152 in FIG. 6. The valve cap 152 of FIG. 6, however, includes a recess 156 formed in a lower surface 155 within the valve cap 152. In order to ensure appropriate placement of the cap adapter 130 in the valve 150 of FIG. 6 and to facilitate insertion of the elongated coupling rod 144 to couple the cap adapter 130 to the valve cap 152, such an extension 148 of the lower surface 136 of the cap adapter 130 may be configured to cooperate with the recess 156 of the valve cap 152. In this way, the extension 148 may be received in the recess 156, while the lower surface 136 of the cap adapter 130 is seated on a lower surface 155 within the valve cap 152. It will be appreciated that the extension 148 may be of any appropriate structure, such as, for example, a donut shape as illustrated in order to accommodate structures within the valve cap 152 or other structures of the valve 150. Those of skill in the art will note that, when the same cap adapter 130 is utilized with the embodiment of the valve 100 and valve cap 112 of FIG. 5, the lower surface 136 of the valve cap 112 is spaced from the valve cap 112 and the extension 148 of the cap adapter 130 does not engage structure of the valve cap 112.

Figure 7:
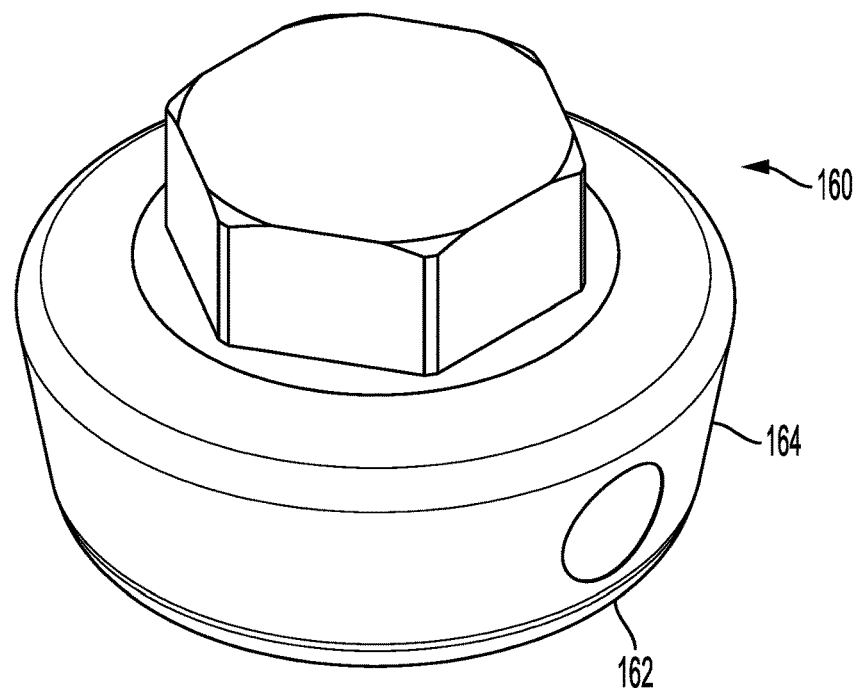
FIG. 7 is an isometric view of a valve cap adapter according to an alternative embodiment of this disclosure.
Figure 8:
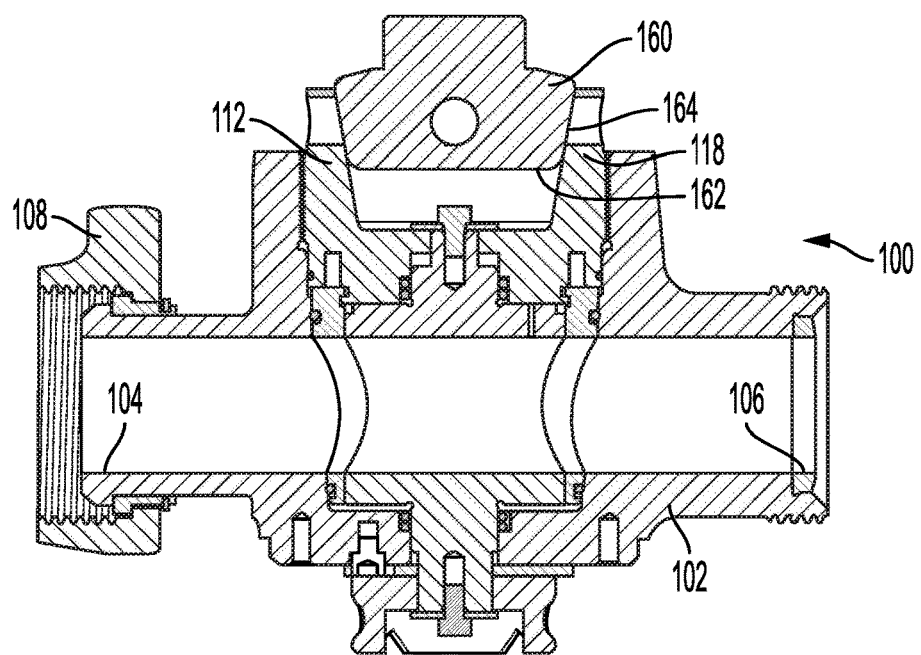
FIG. 8 is a cross-sectional view of a valve and the valve cap adapter according to FIG. 7.
Figure 9:
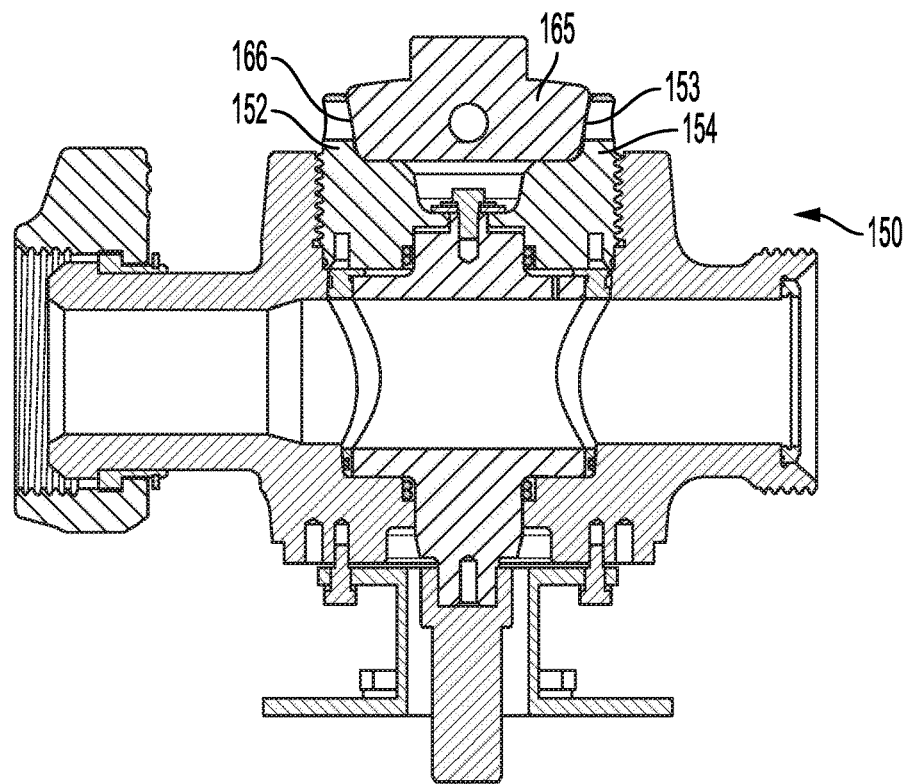
FIG. 9 is a cross-sectional view of an alternatively sized valve and valve cap adapter.

Those of skill in the art will appreciate, however, that a cap adapter 160 according to this disclosure does not necessarily include an extension 148 such as illustrated in FIGS. 1, 2, 4, and 5. As illustrated in FIGS. 7 and 8, for example, the bottom surface 162 of the cap adapter 160 may be substantially planar, and the sidewall 164 may be configured to closely cooperate with the tubular wall 118 of the valve cap 112 such that this close cooperation provides a reliable placement of the cap adapter 160 within the tubular wall 118 of the valve cap 112. While the cap adapter 160 could likewise be utilized in the size of a valve cap 152 in a manner similar to that illustrated in FIG. 6, that is, with the sidewall 164 of the cap adapter 160 spaced from the tubular wall 118 of the valve cap 152, but with a portion of the bottom surface 162 of the cap adapter 160 seated against lower surface 155 of the valve cap 152, such an arrangement may be less efficient in coupling the cap adapter 160 to the valve cap 152. Accordingly, a dedicated cap adapter 165 may be provided which includes a sidewall 166 that closely cooperates with the interior surface 153 of the tubular wall 154 of the valve cap 152, as illustrated in FIG. 9, for example. That is, a dedicated cap adapter may be provided for any given valve cap size and structure.

Figure 10:
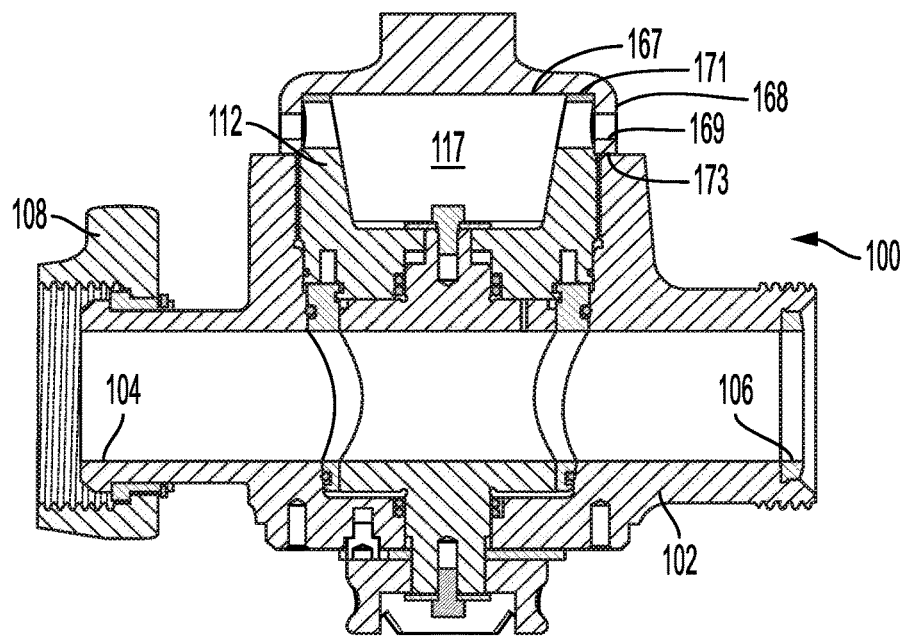
FIG. 10 is a fragmentary cross-sectional view of a valve, elongated coupling rod, and another alternative embodiment of a valve cap adapter.

It will further be appreciated that a cap adapter may be of an alternative design, so long as it may be effectively coupled with a valve cap. As illustrated in FIG. 10, for example, a cap adapter 167 may be configured with a sidewall 168 that extends about an outer periphery of the valve cap 112. In such an arrangement, the sidewall 168 may include one or more coupling holes 169 through which a coupling assembly 142, such as the assembly of either FIG. 3 or 4, may be assembled. In order to assist in locating the cap adapter 167 on the valve cap 112, the cap adapter 167 may include an inside interior surface 171 that seats against an upper annular surface of the tubular wall 118 of the valve cap 112, and/or a lower annular surface 173 of the sidewall 168 of the cap adapter 167 may seat against a surface of the valve body 102. While the interior surface 171 of the cap adapter 167 may be a substantially planar surface that extends between inside surfaces of the sidewall 168 of the cap adapter 167, as illustrated in FIG. 10, those of skill in the art will appreciate that the cap adapter 167 may include structure that extends into the interior cavity 117 of the valve cap 112, so long as any structure disposed within the interior cavity 117 does not interfere with coupling the cap adapter 167. For example, a cap adapter may be formed as a combination of the cap adapter 160 illustrated in FIG. 8 and the cap adapter 167 illustrated in FIG. 10.

It will further be appreciated by those of skill in the art that the disclosed arrangement and method may be utilized with alternative embodiments of a valve cap and cap adapter. For example, the valve cap 290 of FIG. 11 includes a body 292 configured for threaded engagement with a valve body (not illustrated) by way of engaging threads 294 or the like. As opposed to the attachment holes through the tubular wall of the above cap embodiments, an upper surface 296 of the body 292 of the valve cap 290 of FIG. 11 includes a plurality of axially-extending attachment holes 298 for engagement to facilitate removal of the cap 290 from a valve body.

Figure 11:
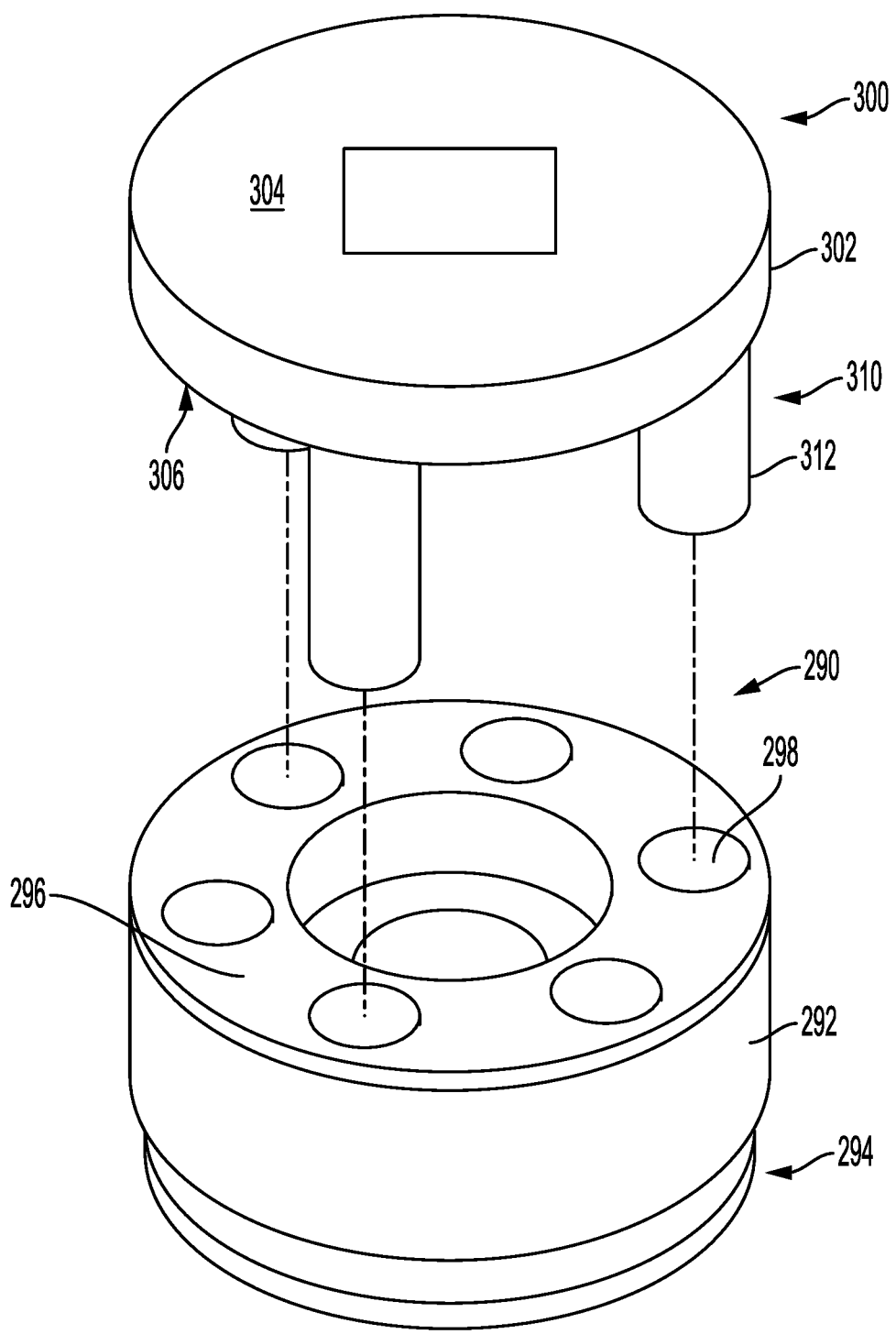
FIG. 11 is a fragmentary, exploded schematic view of an alternative embodiment of a valve cap and valve cap adapter with which the disclosed arrangement and method may be utilized.

An exemplary cap adapter 300 for use in removal of the valve cap 290 is likewise illustrated in FIG. 11. The cap adapter 300 includes a body 302 having an upper surface 304 and a lower surface 306. In this embodiment, the coupling assembly 310 includes a plurality of coupling rods 312 that extend in an axial orientation from the lower surface 306 of the body 302. The coupling rods 312 are configured to the engage a plurality of the attachment holes 298 of the valve cap 290. While the illustrated embodiment of the cap adapter 300 include three such coupling rods 312, any appropriate number of such coupling rods may be provided so long as the rods are disposed to provide adequate leverage to disengage the threaded engagement of the valve cap 290 with a valve body when a removal or output torque is applied to the cap adapter 300. Further, it will be appreciated that the coupling rods 312 may be formed integrally with the body 302, or the coupling rods 312 may be formed as separate structures that are then assembled to bores within the body 302 of the cap adapter 300. In an arrangement where the coupling rods 312 are formed as separate structures which are then assembled into bores within the body 302 of the cap adapter 300, such bores may extend entirely through the body 302 or only partially through the body 302.

Figure 2:
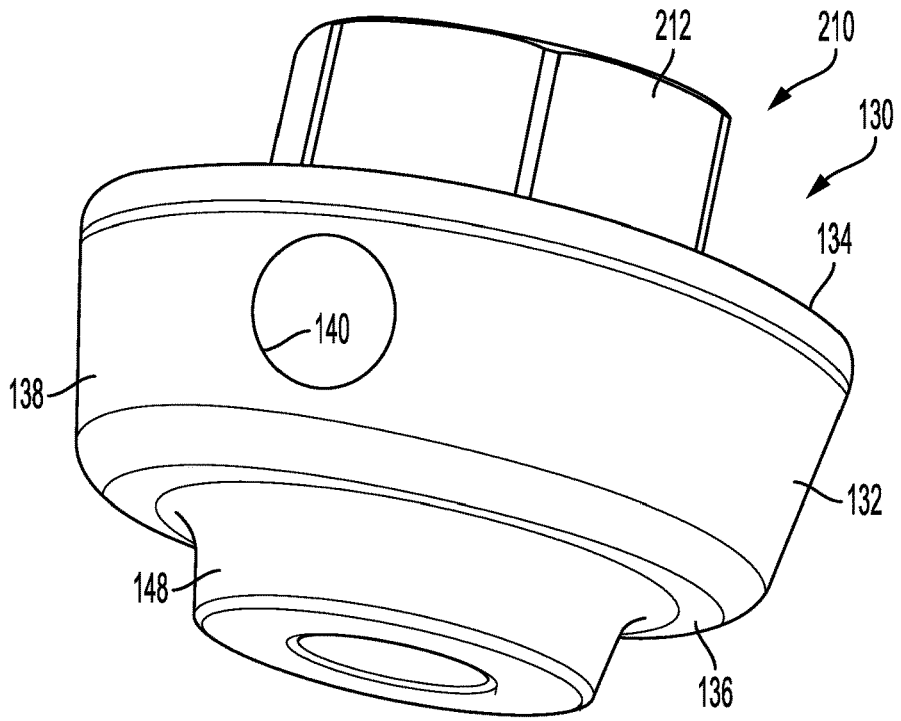
FIG. 2 is an isometric view of a valve cap adapter of FIG. 1.
Figure 5:
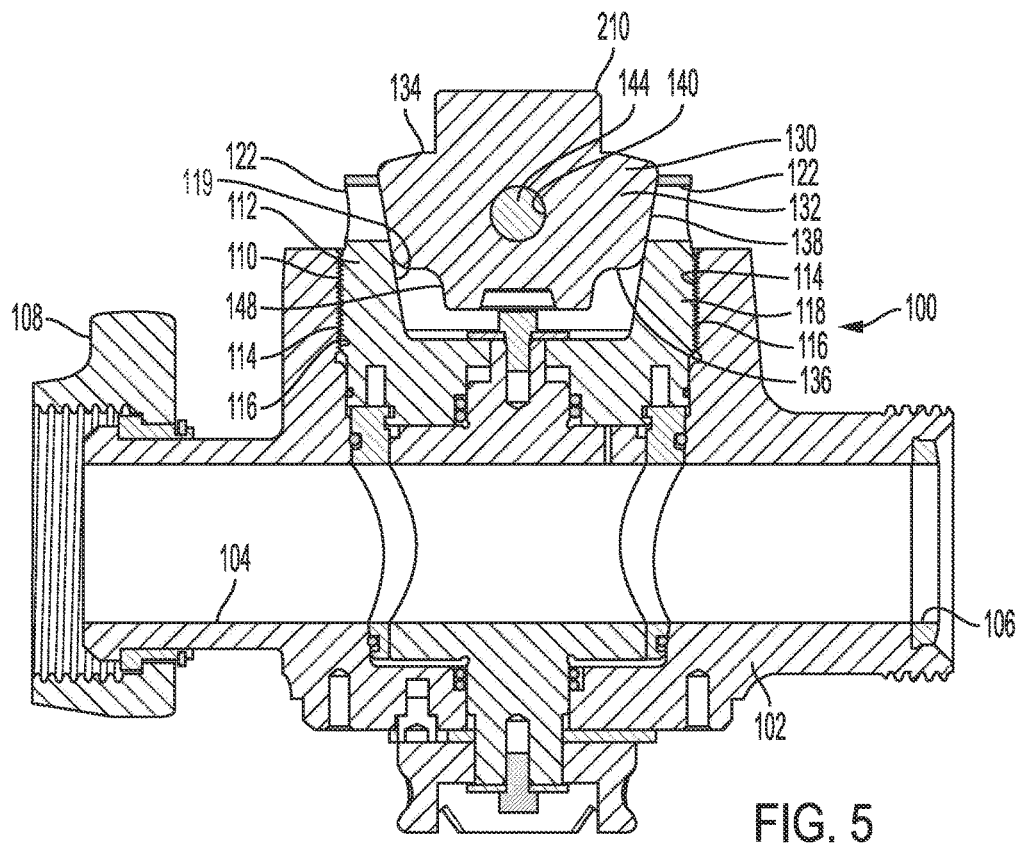
FIG. 5 is a cross-sectional view of the valve, valve cap adapter, and coupling assembly of FIGS. 1 and 3.
Figure 6:
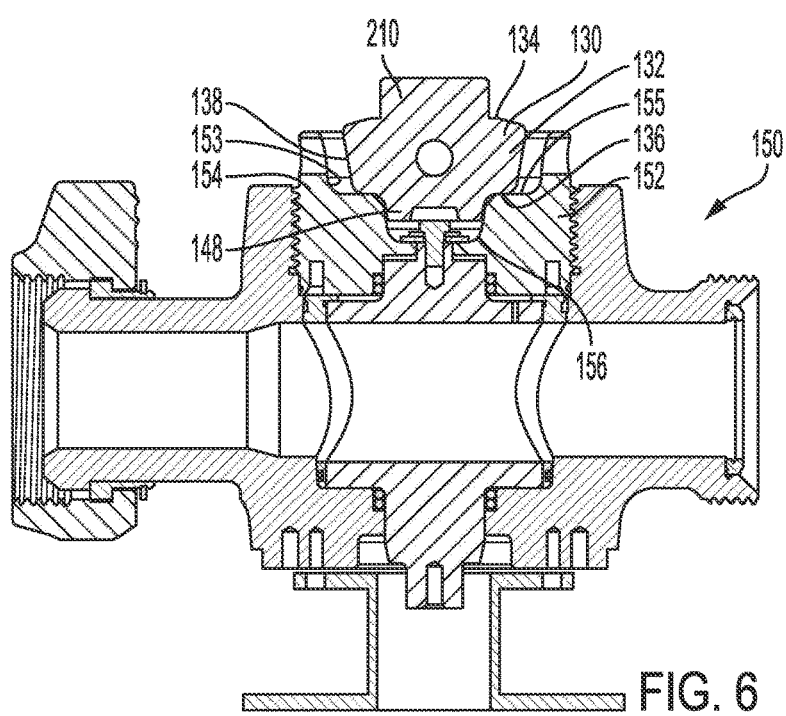
FIG. 6 is a cross-sectional view of the valve cap adapter of FIGS. 1 and 2 disposed with a valve including an alternative embodiment of a valve cap.
Figure 12:
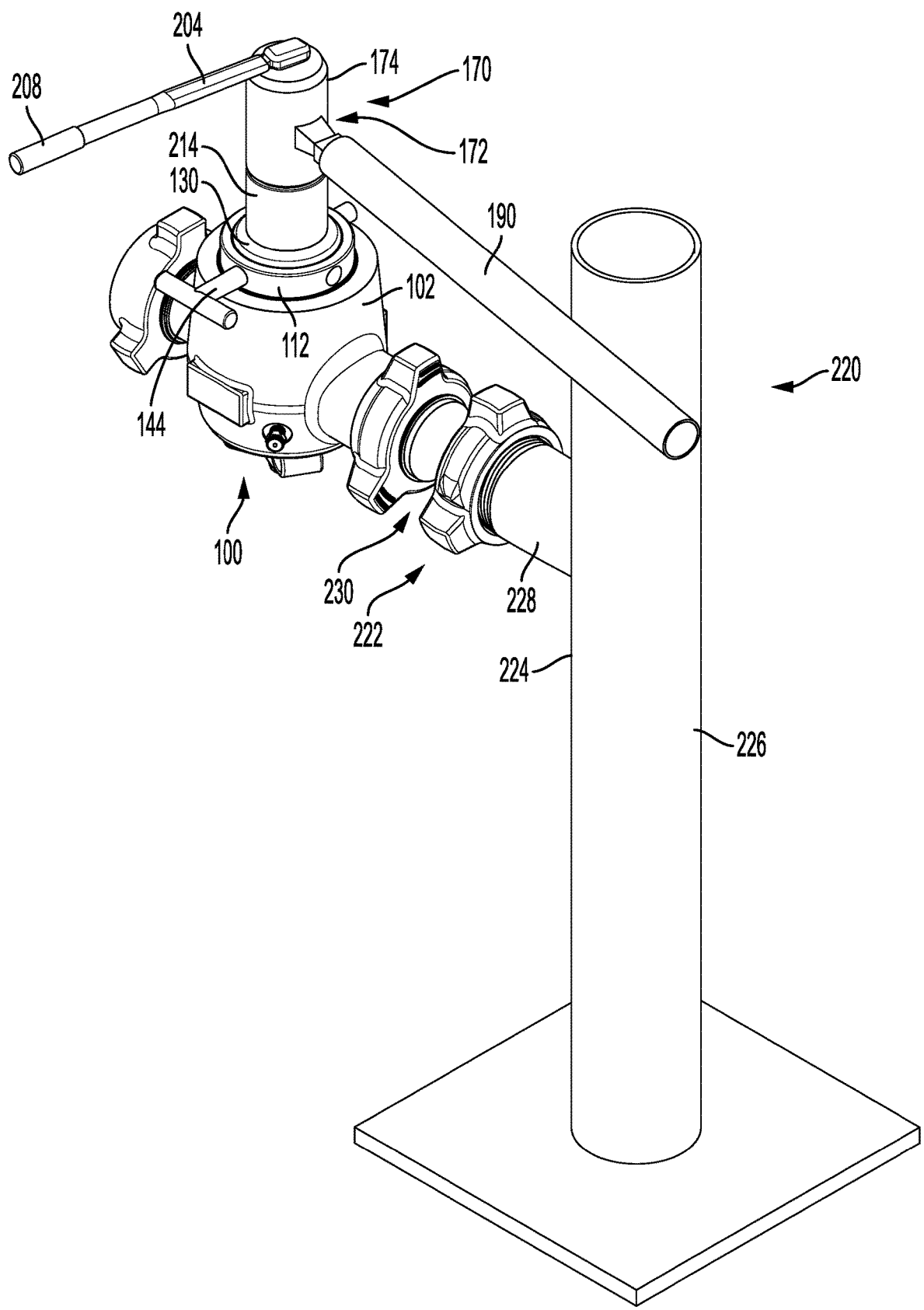
FIG. 12 is an isometric view of a support stand and an arrangement for removing a valve cap including according to aspects of this disclosure.
Figure 13:
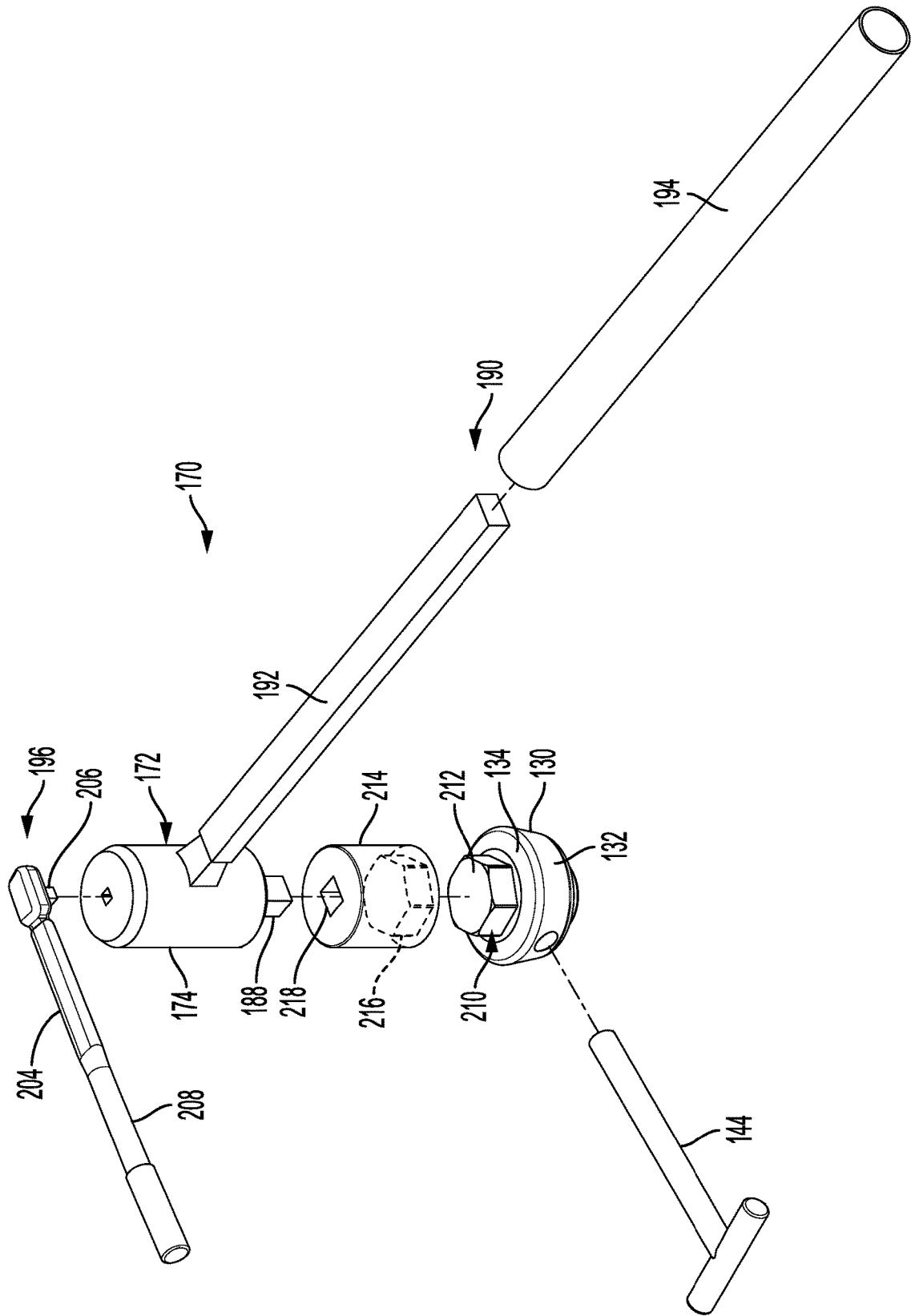
FIG. 13 is an exploded view of elements of the arrangement of FIG. 12.

According to another feature of this disclosure, there is provided an arrangement 170 for removing a valve cap 112 from a valve body 102 (see FIGS. 12 and 13). The exemplary illustrated arrangement 170 includes a cap adapter 130, an elongated coupling rod 144 for coupling the cap adapter 130 to the valve cap 112, and a torque multiplier 172. While the valve 100, valve cap 112, and cap adapter 130 of FIGS. 1, 2, and 5 are illustrated in the arrangement 170 in FIG. 12, and the exploded view of FIG. 13, the use of the cap adapter 130 and valve 100 are provided by way of example only inasmuch as cap adapters 160, 165, 167, and 300 for example, may likewise be utilized in the arrangement 170. Similarly, the arrangement and method disclosed herein are likewise applicable to other valves and valve caps, such as the valve 150 and valve cap 152 of FIGS. 6 and 9, and the valve cap 290 of FIG. 11.

Figure 14:
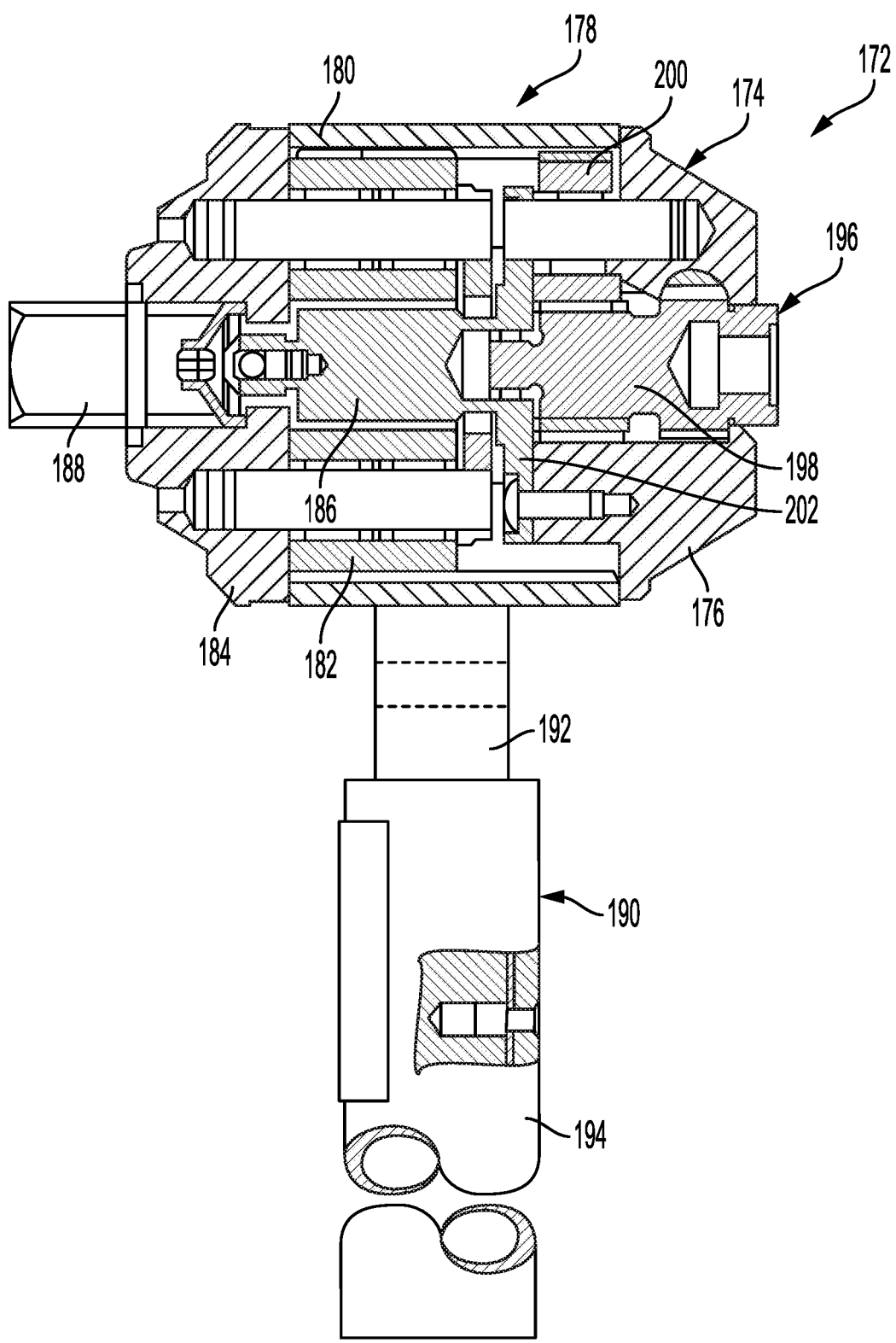
FIG. 14 is a cross-sectional view of an exemplary force multiplier for use in an arrangement according to aspects of this disclosure.

For the purposes of this disclosure, the term "torque multiplier" is to be understood to include an arrangement wherein an input torque is multiplied by the torque multiplier by other than merely increased leverage that is provided by an extended handle, for example. An exemplary embodiment of the torque multiplier 172 is illustrated in the cross-section of FIG. 14. The torque multiplier 172 includes a head 174 having a housing 176 and a plurality of gears 178 configured to multiply an input torque to provide an increased output torque. More specifically, the plurality of gears 178 includes at least one planetary gearing arrangement. In the exemplary embodiment of the torque multiplier 172 illustrated in the cross-section of FIG. 14, for example, ring gear 180 is disposed to engage a plurality of planet gears 182, a portion of the housing 176 acting as a planet carrier 184. The planet gears 182 are disposed to engage a sun gear 186. The sun gear 186 is coupled to an output drive 188; the output drive 188 may include, for example a geometric protrusion, which may be axially extending. The output drive 188 may, for example, be a generally rectangular or square protrusion.

An arm 190 is coupled to the ring gear 180 such that the arm 190 may be utilized to the provide an input torque to the ring gear 180 or to maintain the ring gear 180 in a substantially fixed position. As will be explained in further detail below, in the embodiment illustrated in FIG. 12, the arm 190 is utilized to maintain the ring gear 180 in a substantially fixed position. The arm 190 may include, for example, a reaction plate 192 to which an elongated rod 194 is coupled.

The torque multiplier 172 may additionally include a second planet gear arrangement including a sun gear 198 that engages with at least one planet gear 200, the planet gear 200 likewise engaging with the ring gear 180. An input rotation of the sun gear 198 causes a rotation of the planet gear 200 between the sun gear 198 and the ring gear 180. As the planet gear 200 rotates, an associated planet carrier 202 likewise rotates. The planet carrier 202 is secured with the sun gear 186, such that rotation of the planet carrier 202 causes rotation of the sun gear 186 and the output drive 188.

An input engagement structure 196 is secured with the sun gear 198. As with the arm 190, the input engagement structure 196 may be utilized with an appropriate tool to provide a torque input to the sun gear 198 or to maintain the sun gear 198 in a fixed position. As will be explained in further detail below, in the illustrated embodiment, the input engagement structure 196 is utilized to provide an input torque to the sun gear 198. In order to provide an input torque to the input engagement structure 196 and the associated sun gear 198, an appropriate tool may be provided, such as a wrench 204 or an appropriate power device. The illustrated wrench 204 includes a head 206 for engaging the input engagement structure 196 and an extended handle 208 to which an actuating or input force may be applied by a user to yield an input torque. While the planetary gearing arrangement may be of any appropriate design, it is contemplated that known planetary gearing arrangements and appropriately configured known torque wrenches may be utilized in the arrangement and method disclosed herein.

In order to couple the output drive 188 of the torque multiplier 172 to the cap adapter 130, the cap adapter 130 and the output drive 188 of the torque multiplier 172 are provided with cooperating geometric shapes. In the illustrated embodiment, the cap adapter 130 is provided with coupling structure 210. While the coupling structure 210 may be of an alternative geometric shape, in the illustrated embodiment, the coupling structure 210 protrudes from the upper surface 134 of the cap adapter 130. Similar protruding coupling structures are provided in cap adapters 160, 165 and 167. In the illustrated embodiment, the coupling structure 210 may be hexagonally shaped, that is, a hexagonally-shaped coupling structure presents a hex head 212. The hex head 212 of the illustrated embodiment may be integrally formed with the body 132 of the cap adapter 130, or the hex head 212 a separately fabricated structure that is secured with the upper surface 134 of the body 132 of the cap adapter 130. It will be appreciated, however, that while the coupling structure 210 of cap adapter 130 is illustrated as a geometric protrusion, in alternative embodiments of the cap adapter, the coupling structure may include a recess in the upper surface of the cap adapter or a combination of a recess and a protrusion. For example, the cap adapter could include a generally square recess configured to cooperatively receive a generally square shaft of an output drive of a standard torque wrench arrangement.

As with cap adapters 130, 160, 165, 167, the cap adapter 300 includes a coupling structure 314 (see FIG. 11). In this embodiment, however, the coupling structure 314 is formed as a recess or opening 316 into the body 302 of the cap adapter 300, rather than a protrusion. In the illustrated embodiment, for example, the recess or opening 316 is a square opening. In this way, the output drive 188 of the illustrated torque multiplier 172 may be directly engaged with the coupling structure 314 of the cap adapter 300 to facilitate the application of the output torque to the valve cap 290.

Referring to FIGS. 12 and 13, in order to couple the torque multiplier 172 with the coupling structure 210 of the cap adapter 130 to prevent relative rotation therebetween, the torque multiplier 172 may further include a socket adapter 214. The socket adapter 214 is configured to be coupled with the coupling structure 210 of the cap adapter 130 and coupled with the output drive 188 of the torque multiplier 172. While the socket adapter 214 may be of an alternative design, the illustrated socket adapter 214 includes a first socket adapter coupling structure 216 configured to cooperate with the coupling structure 210 of the cap adapter 130, and a second socket adapter coupling structure 218 configured to cooperate with the output drive 188 of the torque multiplier 172. In the illustrated embodiment, the first socket adapter coupling structure 216 includes a geometric recess, configured to receive the geometric protrusion of the coupling structure 210 of the cap adapter 130. More particularly, the first socket adapter coupling structure 216 includes a hexagonally shaped recess.

Similarly, in the illustrated embodiment, the second socket adapter coupling structure 218 includes a geometric recess configured to receive the geometric protrusion of the output drive 188. Again, more particularly, the second socket adapter coupling structure 218 includes a generally square recess configured to cooperatively receive a generally square shaft of the output drive 188. Those of skill in the art will appreciate, however, that alternative embodiments within the scope of this disclosure include first and/or second socket adapter coupling structures that include geometric protrusions configured to cooperate with geometric recesses of the cap adapter and/or the output drive 188. It will further be appreciated that in at least some embodiments, the socket adapter 214, as well as the head 174 and input engagement structure 196 of the torque multiplier 172 may be of a standard design.

In this way, one or more of the output drive 188 of the torque multiplier 172, the second socket adapter coupling structure 218, the first socket adapter coupling structure 216, the coupling structure 210 of the cap adapter 130, the cap adapter 130, and the valve cap 112 may be axially aligned to facilitate the application of the output torque to the valve cap 112.

Returning to FIG. 12, in order to support the valve body 102 during use of the torque multiplier 172 with the valve cap 112, the arrangement 170 may further include a support structure 220, such as a coupler 222 and a stand 224. While any appropriate support structure 220 may be provided, including many known in the art, in the illustrated embodiment, the stand 224 includes an upright support 226 with a generally horizontally extending support 228 to which the valve body 102 may be coupled by way of the coupler 222. For example, the coupler 222 may be rotatably coupled with the horizontally extending support 228, and may include a threaded arrangement 230 configured to engage a threaded portion of the valve body 102 or the coupler 108 of the valve body 102.

The cap adapter 130, 160, 165, 167, 300 and the coupling assembly 142, 242, 310 may be formed of any appropriate material and by any appropriate fabrication method. By way of example only, the cap adapter 130, 160, 165, 167, 300 may be formed of a reinforced polymeric material or a metal alloy, and may be cast, forged, welded, turned, or otherwise molded. Similarly, the coupling assembly 142, 242, 310 may be formed of a reinforced polymeric material or metal alloy, and may be turned, extruded, cast, forged, welded, or otherwise formed.

INDUSTRIAL APPLICABILITY

While the exemplary method is explained with regard to the valve 100 and cap adapter 130, it will be appreciated that the method is likewise applicable to the valve 150 and the other cap adapters 160, 165, 167, 300 discussed herein. In an exemplary method according to this disclosure, the valve 100 may be coupled to the support structure 220 or other appropriate support device by any appropriate mechanism. For example, the coupler 222 may be threaded to a threaded portion of the valve body 102 to couple the valve body 102 to the illustrated horizontally extending support 228.

The cap adapter 130 is engaged with the valve cap 112 by way of the coupling assembly 142. In the embodiments of FIGS. 1 and 5, at least a portion of the body 132 of the cap adapter 130 is engaged with the tubular wall 118 of the valve cap 112, and at least one elongated coupling rod 144 is then inserted into a first attachment hole 120 of the valve cap 112, and into the at least one coupling hole of cap adapter 130. In an embodiment wherein the coupling hole 140 of the cap adapter 130 is a radially-extending through hole, the at least one elongated coupling rod 144 may be further advanced through the radially-extending though hole 140 and through a second attachment hole 120 of the valve cap 112. In an alternative embodiment, a second elongated coupling rod 144 may be inserted through a second attachment hole 120 and a second coupling hole 140. It will be appreciated that at least a portion of the body 132 of the cap adapter 130 in disposed within the tubular wall 118 of the valve cap 112, as well as with cap adapters 160 and 165, while the sidewall 168 of the cap adapter 167 is disposed about the outer periphery of the sidewall 118. With valve cap 290, however, cap adapter 300 may engaged with the valve cap 290 as the coupling rods 312 of the coupling assembly 310 are engaged with the holes 298 of the valve cap 290.

The output drive 188 of the torque multiplier 172 is then coupled to the cap adapter coupling structure 210. While the output drive 188 may be engaged directly with the cap adapter coupling structure 314 in the embodiment of cap adapter 300, in at least one embodiment, the output drive 188 is coupled to the cap adapter coupling structure 210 by way of the socket adapter 214. In this way, a first socket adapter coupling structure 216 is engaged with the cap adapter coupling structure 210, and a second socket adapter coupling structure 218 is engaged with the output drive 188. That is, in the illustrated embodiment, the first socket adapter coupling structure 216 in the form of a hexagonal recess is engaged with the cap adapter coupling structure 210 in the form of a hex head 212, and the second socket adapter coupling structure 218 in the form of a generally square recess is engaged with the output drive 188 in the form of a generally square protrusion. Arm 190 of the torque multiplier 172 is disposed to abut the upright support 226 of the stand 224. An input force is then provided to the extended handle 208 of the wrench 204 to provide an input torque to the plurality of gears 178 of the torque multiplier 172 and an output torque to the output drive 188 and the cap adapter 130 to rotate the cap adapter 130 and the valve cap 112 to which the cap adapter 130 is coupled. In this way, the input torque to the input engagement structure 196 is increased by the torque multiplier 172 to provide an output torque exerted on the cap adapter 130 that is greater than the input torque at the input engagement structure 196.

Some embodiments of the cap adapter and arrangement for removing a valve cap from a valve body may facilitate the removal of a valve cap from a valve body in order to permit inspection or service. As a result, some embodiments may enhance operational safety by facilitating the removal of a valve cap from a valve body without extreme exertion by an operator or the utilization of unsafe methods and tools to remove a valve cap.

Some embodiments may facilitate enhanced service life of such valves by facilitating the inspection and service of valves that might otherwise be scraped or replaced if inspection and service are unavailable.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A valve cap adapter configured to be coupled to a valve cap including a tubular wall including at least one pair of attachment holes extending through the tubular wall, the valve cap adapter comprising:

a body including an upper surface, a lower surface, a cylindrical sidewall extending between the upper surface and lower surface, and at least two coupling holes, the coupling holes being axially aligned with one another;

a cap adapter coupling structure extending axially from the upper surface of the body, the cap adapter coupling structure including a hex head secured with the body; and an extension protruding axially from the lower surface.

2. A valve cap adapter configured to be coupled to a valve cap including a tubular wall including at least one pair of attachment holes extending through the tubular wall, the valve cap adapter comprising:

a body including an upper surface, a lower surface, a cylindrical sidewall having a tapered cylindrical structure extending between the upper surface and lower surface, and at least two coupling holes, the coupling holes being axially aligned with one another, and a cap adapter coupling structure extending axially from the upper surface of the body, the cap adapter coupling structure including a hex head secured with the body.

3. The valve cap adapter of claim 2 wherein the at least two coupling holes unite to form a through hole extending through the body.

4. An arrangement for removing a valve cap from a valve body, the valve cap being engaged with the valve body, the valve cap including at least one attachment hole, the arrangement comprising:

a cap adapter including a cap adapter coupling structure, and at least one coupling rod, the at least one elongated coupling rod being configured to be received into the at least one attachment hole, and a torque multiplier including a head containing a plurality of gears and an output drive, and an input engagement structure, the output drive of the torque multiplier being configured to be coupled with the cap adapter coupling structure to prevent relative rotation between the output drive of the torque multiplier and the cap adapter coupling structure, the plurality of gears being configured to receive an input torque from the input engagement structure, and provide an output torque to the output drive, the output torque being greater than the input torque.

5. The arrangement of claim 4 wherein the valve cap includes a tubular wall extending from an upper surface of the valve body, the at least one attachment hole extending through the tubular wall, the cap adapter includes a body having a sidewall, the sidewall being configured to be disposed substantially adjacent the tubular wall, the body including at least one coupling hole, the at least one coupling hole being configured to align with the at least one attachment hole of the valve cap, and the at least one coupling rod is configured to be received through the at least one attachment hole and the at least one coupling hole.

6. The arrangement of claim 5 wherein the valve cap includes at least one pair of attachment holes, and wherein the at least one coupling hole of the cap adapter includes at least a pair of coupling holes, the coupling holes being axially aligned with one another, and being configured to be aligned with the attachment holes of the valve cap.

7. The arrangement of claim 4 wherein the plurality of gears includes a planetary gearing arrangement wherein an input torque exerted on the input engagement structure is increased by the planetary gearing arrangement as applied to the cap adapter by the output drive.

8. The arrangement of claim 7 wherein the input engagement structure is configured to provide rotation to a gear of the planetary gearing arrangement.

9. The arrangement of claim 4 wherein the torque multiplier includes a socket adapter, the socket adapter being configured to be coupled with the cap adapter coupling structure and coupled with the output drive of the head of the torque multiplier.

10. The arrangement of claim 9 wherein the output drive of the torque multiplier includes an axially-extending geometric protrusion, and the socket adapter includes a first socket adapter coupling structure configured to cooperate with the cap adapter coupling structure, and a second socket adapter coupling structure configured to cooperate with the geometric protrusion of the output drive of the torque multiplier.

11. The arrangement of claim 10 wherein the plurality of gears includes a planetary gearing arrangement including at least one sun gear, and wherein the cap adapter coupling structure includes a hex head, the first socket adapter coupling structure includes a hexagonally-shaped recess, and the second socket adapter coupling structure includes a geometric recess configured to receive the geometric protrusion of the output drive, wherein the geometric recess, the hexagonally-shaped recess, and the hex head are configured to axially align the at least one sun gear with the valve cap.

12. A method of removing a valve cap from a valve body, the valve cap being threadedly engaged with the valve body, the valve cap including at least one attachment hole, the method comprising:

providing a cap adapter including a cap adapter coupling structure and at least one coupling rod, inserting the at least one coupling rod through the at least one attachment hole to couple the cap adapter to the valve cap, coupling an output drive of a torque multiplier with the cap adapter coupling structure to prevent relative rotation between the torque multiplier and the cap adapter coupling structure, and exerting an input torque on the torque multiplier to rotate the cap adapter and the valve cap, the input torque exerted on the torque multiplier being increased by the torque multiplier such that an output torque exerted on the cap adapter is greater than the input torque.

13. The method of claim 12 wherein coupling the output drive of the torque multiplier includes coupling an output drive of a torque multiplier including a plurality of gears wherein the plurality of gears increases the input torque exerted on the torque multiplier.

14. The method of claim 13 wherein the plurality of gears includes a planetary gearing arrangement.

15. The method of claim 13 wherein coupling the output drive of the torque multiplier includes coupling a torque multiplier head of the torque multiplier with the cap adapter, the torque multiplier head including said plurality of gears, and exerting the input torque includes exerting an input force on an input engagement structure.

16. The method of claim 15 further including coupling the valve body to a support structure, and securing at least a portion of the torque multiplier against rotation, and wherein exerting the input torque further includes coupling a wrench to the input engagement structure and exerting the input force on an extended handle of the wrench.

17. The method of claim 12 wherein coupling the output drive of the torque multiplier includes coupling a socket adapter of the torque multiplier with the cap adapter coupling structure, and coupling the output drive with the socket adapter.

18. The method of claim 17 wherein coupling the output drive of the torque multiplier further includes coupling a first socket adapter coupling structure with the cap adapter coupling structure, and coupling the output drive of the torque multiplier with a second socket adapter coupling structure.

19. The method of claim 12 wherein the valve cap includes a tubular wall and the tubular wall includes the at least one attachment hole, and wherein providing the cap adapter includes providing the cap adapter including a body having at least one coupling hole and the cap adapter coupling structure, and providing the at least one coupling rod, wherein inserting the at least one coupling rod includes disposing at least a portion of the body of the cap adapter substantially adjacent the valve cap and inserting the at least one coupling rod through the at least one attachment hole and the at least one coupling hole to couple the cap adapter to the tubular wall of the valve cap.

\* \* \* \* \*